United States Patent
Hayami et al.

(10) Patent No.: US 6,673,867 B1
(45) Date of Patent: Jan. 6, 2004

(54) HEAT-RESISTANT ENGINEERING PLASTIC RESIN COMPOSITION AND MOLDED ARTICLE OBTAINED THEREFROM

(75) Inventors: Hiroshi Hayami, Osaka (JP); Shinya Nishikawa, Osaka (JP)

(73) Assignee: Sumitomo Electric Fine Polymer, Inc., Osaka (JP)

(*) Notice: Subject to any disclaimer, the term of this patent is extended or adjusted under 35 U.S.C. 154(b) by 0 days.

(21) Appl. No.: 09/959,891
(22) PCT Filed: May 22, 2000
(86) PCT No.: PCT/JP00/03277
§ 371 (c)(1), (2), (4) Date: Nov. 13, 2001
(87) PCT Pub. No.: WO00/73389
PCT Pub. Date: Dec. 7, 2000

(30) Foreign Application Priority Data

May 26, 1999 (JP) ............................................. 11-145801

(51) Int. Cl.⁷ .................... C08L 77/00; C08L 51/00; C08J 3/28
(52) U.S. Cl. ..................... 525/63; 525/64; 525/69; 525/70; 525/71; 525/87; 525/88; 525/92; 525/93; 525/179; 525/184; 525/421; 525/437; 522/113; 522/114; 522/161
(58) Field of Search ....................... 525/63, 64, 69, 525/70, 71, 87, 88, 92, 93, 179, 184, 421, 437; 522/113, 114, 161

(56) References Cited

U.S. PATENT DOCUMENTS

| | | | |
|---|---|---|---|
| 3,976,720 A | | 8/1976 | Hammer et al. |
| 4,537,929 A | | 8/1985 | Nangrani |
| 4,816,515 A | * | 3/1989 | Weiss ......................... 525/68 |
| 5,106,909 A | * | 4/1992 | Sezume et al. ............ 525/176 |
| 5,356,992 A | * | 10/1994 | Cottis et al. ................. 525/68 |
| 5,420,198 A | * | 5/1995 | Papazoglou et al. ......... 525/66 |
| 5,451,642 A | * | 9/1995 | Abe et al. ................... 525/179 |
| 5,859,176 A | * | 1/1999 | Nakahashi et al. ........... 525/92 |

FOREIGN PATENT DOCUMENTS

| | | |
|---|---|---|
| DE | 42 09 881 | 3/1992 |
| EP | 0 092 728 | 11/1983 |
| EP | 0 092 729 | 11/1983 |
| GB | 2 265 625 | 10/1993 |
| JP | 60-001231 | 1/1985 |
| JP | 03-033134 | 2/1991 |
| JP | 03-039316 | 2/1991 |
| JP | 05-202265 | 8/1993 |
| JP | 06-049352 | 2/1994 |
| JP | 07-149885 | 6/1995 |
| JP | 08-134337 | 5/1996 |

* cited by examiner

Primary Examiner—James J. Seidleck
Assistant Examiner—Olga Asinovsky
(74) Attorney, Agent, or Firm—McDermott, Will & Emery

(57) ABSTRACT

A heat-resistant engineering-plastic composition that satisfies a soldering-heat resistance of 260° C. for 10 to 60 secs., that is less costly, that is free of problems in injection molding process, and that is excellent in heat-aging resistance. A heat-resistant molded product made with the heat-resistant engineering-plastic composition, such as a connector mounted on printed circuit board. The heat-resistant molded product is produced by (a) melt-kneading (a1) an engineering plastic either having or introduced an active site for reacting with a specific functional group and (a2) either an organic compound that has both the said specific functional group and a polymerizing functional group in the same molecule or polyolefin that has the said specific functional group described in (a1) to obtain a resin composition, (b) melt-molding the resin composition comprising of (a), and (c) irradiating the melt-molded resin composition with ionizing radiation.

15 Claims, No Drawings

HEAT-RESISTANT ENGINEERING PLASTIC RESIN COMPOSITION AND MOLDED ARTICLE OBTAINED THEREFROM

TECHNICAL FIELD

The present invention relates to a heat-resistant engineering-plastic resin composition and a heat-resistant injection molded product made with the resin composition, such as for a surface mount PCB (printed circuit board) connector featuring high soldering-heat resistance and heat-aging resistance.

BACKGROUND ART

Downsizing and improvement for the performance of electronic devices and parts have brought a high density parts-mounting technology for PCB.

Consequently, not only electronic parts such as semiconductors and capacitors but also peripheral electronic parts such as connectors, which are used for data input and output, have been mounted on PCB. Conventionally, electronic parts were soldered on PCB via through holes. However, these parts mounting process have been increasingly converting to so-called SMT (surface mounting technology) in recent years to realize higher parts mounting density.

If a resin product melts or deforms when it is in contact with flow solder at high temperature, it cannot be applied in practical use. Therefore, in recent years, electronic parts having resin component such as resin substrates or connectors have been increasingly required to have enhanced soldering-heat resistance to keep the original shape without melting or deforming even when they are exposed to flow solder at high temperature.

As for the PCB connectors, polyamide-based plastics such as nylon 6,6 and polyester-based plastics such as polybutyleneterephthalate (PBT) have been used as the housing materials. However, the soldering heat-resistance of these plastics have a limitation of about 240° C. for 10 to 60 sec.

On the other hand, since the soldering-heat resistance of 260° C. for 10 to 60 sec is required in case for a narrow-pitch type or thin-walled type surface-mounted connector, engineers have no choice but to use so-called super engineering plastics such as a liquid crystal polymer (LCP) and polyphenylenesulfide (PPS). However, these super engineering plastics are costly comparing with conventional general-purpose engineering plastics such as nylon 6,6 and PBT. As a result, the price of the connectors increases.

Even if their high cost is tolerated, super engineering plastics are following disadvantageous in the injection molding process:

(a) They require higher temperature for injection molding, and this reduces the life time of the metal mold;

(b) The weld-line strength is low; and (c) The molded product may have anisotropy in mechanical strength.

Concerning with solder, the tin-lead alloy has been used conventionally for flow or re-flow soldering process. However, worldwide interest on environmental problems in recent years has compelled the intensified study on lead-free solder. As a result, the practical use of lead-free solders has been steadily increasing. However, lead-free solders have higher melting point of about 20° C. or more than conventional tin-lead alloy solder. Therefore, at least 20° C. of increase for soldering temperature cannot be avoided in case for the lead-free solder, and at least 260° C. for 10 to 60 sec of soldering-heat resistance has been required for the housing materials for electronic parts such as PCB connectors.

As mentioned above, conventional common engineering plastics, such as nylon 6,6 and PBT, have a limitation of soldering-heat resistance of 240° C. for 10 to 60 sec. They do not satisfy the requirement for the soldering-heat resistance of 260° C. for 10 to 60 sec. On the other hand, super engineering plastics such as LCP and PPS have the above-described problems of the cost increase and the disadvantages in the injection molding process.

One of the methods to solve these problems is the cross-linking of nylon 6 or PBT using ionizing radiation. However, even when nylon 6 and PBT are irradiated with electron beam or γ ray, if the dose is low, sufficient cross-linking density cannot be obtained. In other words, low-dose irradiation does not satisfy the soldering-heat resistance of 260° C. specification. On the other hand, high-dose irradiation for increasing the cross-linking density causes partial decomposition of nylon 6 and PBT during the irradiation process to deteriorate the mechanical strength of the material after heat aging test.

DISCLOSURE OF THE INVENTION

An aim of the present invention is to offer the low cost heat-resistant engineering-plastic composition and injection molded electronic parts such as PCB connectors which satisfies the soldering-heat resistance of 260° C. for 10 to 60 sec, and has no problems in the injection molding process, and has excellent in heat-aging resistance. By an intensive study on the foregoing problems, the present inventors found that the intended molded product can be obtained by the following process: (a) melt-kneading (a1) an engineering plastic either having or introduced an active site for reacting with a specific functional group and (a2) either an organic compound that has both the said specific functional group and a polymerizing functional group in the same molecule or polyolefin that has the functional group described in (a1) to obtain a engineering-plastic based resin composition, (b) melt-molding of resin composition of (a), and (c) irradiating the melt-molded plastic composition with ionizing radiation. Thus, the present inventors completed the present invention.

A molded product made with a heat-resistant engineering-plastic based resin composition of the present invention can be embodied by the following methods:

① (a) melt-kneading of (a1) an acid anhydride group introduced styrene based polymer and (a2) an organic compound that has in the same molecule both (a2a) a polymerizing functional group selected from the groups consisting of vinyl group, allyl group, acrylic group, and methacrylic group and (a2b) a functional group selected from the groups consisting of amino group and epoxy group;

(b) molding a resin composition of (a) into a specified shape by a melt-molding method such as an injection molding method; and (c) cross-linking of the molded parts of (b) by ionizing radiation.

② (a) melt-kneading of (a1) an oxazoline group introduced styrene based polymer and (a2) an organic compound that has in the same molecule both (a2a) polymerizing functional groups selected from the groups consisting of a vinyl group, allyl group, acrylic group, and methacrylic group and (a2b) functional group selected from the groups consisting of amino group, carboxylic acid group, hydroxyl group, epoxy group, and thiol group;

(b) molding a resin composition of (a) into a specified shape by melt-molding method such as injection molding; and (c) cross-linking of the molded parts of (b) by ionizing radiation.

③ (a) melt-kneading (a1) a carboxylic acid group introduced styrene based polymer and (a2) an organic compound that has in the same molecule both (a2a) a polymerizing functional group selected from the groups consisting of vinyl group, allyl group, acrylic group, and methacrylic group and (a2b) a functional group selected from the groups consisting of amino group, hydroxyl group, epoxy group, and thiol group;

(b) molding a resin composition of (a) into a specified shape by a melt-molding method such as an injection molding; and (c) cross-linking of the molded parts of (b) by ionizing radiation.

④ (a) melt-kneading (a1) an acid anhydride group introduced polyphenylene ether and (a2) an organic compound that has in the same molecule both (a2a) a polymerizing functional group selected from the groups consisting of vinyl group, allyl group, acrylic group, and methacrylic group and (a2b) a functional group selected from the groups consisting of amino group and epoxy group;

(b) molding a resin composition of (a) into a specified shape by a melt-molding method such as an injection molding; and (c) cross-linking of the molded parts of (b) by ionizing radiation.

⑤ (a) melt-kneading (a1) polybutyleneterephthalate and (a2) an organic compound that has in the same molecule both (a2a) a polymerizing functional group selected from the groups consisting of vinyl group, allyl group, acrylic group, and methacrylic group and (a2b) a functional group selected from the groups consisting of amino group, hydroxyl group, epoxy group, and carboxylic acid group;

(b) molding a resin composition of (a) into a specified shape by a melt-molding method such as an injection molding; and (c) cross-linking of the molded parts of (b) by ionizing radiation.

⑥ (a) melt-kneading (a1) polyamide resin, such as nylon 6, nylon 6,6, nylon 6,12, or nylon 6T, and (a2) an organic compound that has in the same molecule both (a2a) a polymerizing functional group selected from the groups consisting of vinyl group, allyl group, acrylic group, and methacrylic group and (a2b) an atomic group having a functional group selected from the groups consisting of epoxy group, carboxylic acid group, and acid anhydride group;

(b) molding a resin composition of (a) into a specified shape by a melt-molding method such as an injection molding; and (c) cross-linking of the molded parts of (b) by ionizing radiation.

⑦ (a) melt-kneading (a1) polybutyleneterephthalate and (a2) a polyolefin having a graft-polymerized or copolymerized monomer that react with polyester;

(b) molding a resin composition of (a) into a specified shape by a melt-molding method such as an injection molding; and (c) cross-linking of the molded parts of (b) by ionizing radiation.

⑧ (a) melt-kneading (a1) polyamide resin, such as nylon 6, nylon 6,6, nylon 6,12, or nylon 6T, and (a2) polyolefin having a graft-polymerized or copolymerized monomer that reacts with polyamide;

(b) molding a resin composition of (a) into a specified shape by a melt-molding method such as an injection molding method; and (c) cross-linking of the molded parts of (b) by ionizing radiation.

⑨ (a) melt-kneading (a1) an acid anhydride group introduced polyphenylene ether and (a2) a polyolefin having a graft-polymerized or copolymerized monomer that reacts with an acid anhydride group of the polyphenylene ether;

(b) molding a resin composition of (a) into a specified shape by a melt-molding method such as an injection molding method; and (c) cross-linking of the molded parts of (b) by ionizing radiation.

Specific examples of item ① are an acid anhydride introduced styrene based polymer include a copolymer of maleic anhydride and styrene and a copolymer of maleic anhydride, styrene, and acrylonitrile. These polymers can be obtained, for example, by radical copolymerization of monomers such as styrene, acrylonitrile, and maleic anhydride. The desirable content of maleic anhydride in the above-mentioned copolymer in a range of 0.1 to 10 mol %, more desirably 0.5 to 5 mol %. If the content is less than 0.1 mol %, a sufficient cross-linking degree to satisfy the required soldering-heat resistance may not be obtained. On the other hand, even if the copolymerization exceeding 10 mol % is carried out, a better result cannot be obtained. Moreover, the flexural modulus and mechanical strength may decrease, and the material price may increase. As for the organic compound that has in the same molecule both (a) a polymerizing functional group selected from the groups consisting of vinyl group, allyl group, acrylic group, and methacrylic group and (b) an atomic group having a functional group selected from the groups consisting of amino group, epoxy group, and hydroxyl group, the following examples can be shown: aminoethylvinyl ether, 4-aminostyrene, 4-hydroxystyrene, allyl phenol, allyl glycidyl ether, allylamine, diallylamine, glycidylacrylate, glycidylmethacrylate, and aminoethylmethacrylate. In these examples, it is desirable to use a compound that has a methacrylic group and an epoxy group in the same molecule, such as glycidylmethacrylate, because it has a better quality in melt-mixing with the foregoing polymers. The desirable amount for the organic compound is in a range of 0.5 to 20 parts by weight per 100 parts by weight of the acid anhydride group introduced styrene based polymer, more desirably 1 to 10 parts by weight. If less than 0.5 parts by weight, the cross-linking degree may be insufficient to meet the required soldering-heat resistance. On the other hand, even if the added amount exceeds 20 parts by weight, a better result cannot be obtained. Moreover, the processibility of melt-mixing and injection molding may decrease.

Specific examples of oxazoline group introduced styrene based polymers for item ② include a copolymer of styrene and 2-propenyl oxazoline and a copolymer of styrene, acrylonitrile, and 2-propenyl oxazoline. These polymers can be synthesized, for example, by radical copolymerization of monomers such as styrene, acrylonitrile, and 2-propenyl oxazoline. It is desirable that the 2-propenyl oxazoline content in the above-mentioned copolymers is in a range of 0.1 to 10 mol %, more desirably 0.5 to 5 mol %. If the copolymerization ratio is less than 0.1 mol %, a sufficient cross-linking degree to meet the required soldering-heat resistance may not be obtained. On the other hand, even if the copolymerization exceeding 10 mol % is carried out, a better result cannot be obtained. Moreover, the flexural modulus and mechanical strength may decrease, and the material price may increase.

As for the organic compound that has in the same molecule both (a) a polymerizing functional group selected from the groups consisting of vinyl group, allyl group, acrylic group, and methacrylic group and (b) an atomic group having a functional group selected from the groups consisting of hydroxyl group, carboxylic acid group, and thiol group, the following examples can be shown: 4-hydroxystyrene, 4-aminostyrene, allyl phenol, acrylic acid, glycidylacrylate, 2-acryloyloxyethylsuccinate, 2-acryloyloxyethyl phthalate, methacrylic acid, 2-methacryloyloxyethylsuccinate, and 2-methacryloyloxyethyl phthalate.

In these examples, it is desirable to use a compound that has a methacrylic group and a carboxylic acid group in the same molecule, such as methacrylic acid and 2-methacryloyloxyethylphthalate. The desirable added amount of organic compound is in a range of 0.1 to 20 parts by weight per 100 parts by weight of the oxazoline group containing styrene based polymer, and more desirably 0.5 to 10 parts by weight. If less than 0.1 part by weight, the cross-linking degree may be insufficient to meet the required soldering-heat resistance. On the other hand, even if the added amount exceeds 20 weight parts, a better result cannot be obtained. Moreover, the processibility of melt-mixing and injection molding may decrease.

Specific examples of carboxyl acid group introduced styrene based polymer of item ③ include a copolymer of styrene and methacrylic acid; a copolymer of styrene, acrylonitrile, and methacrylic acid; a copolymer of styrene, acrylonitrile, and acrylic acid; a copolymer of styrene and itaconic acid; and other plastics based on carboxylic acid-modified polystyrene. These polymers can be synthesized by radical polymerization and other known methods.

The content of the carboxylic acid group in the above styrene-based copolymer can be controlled by changing the ratio of the copolymerization ratio of the unsaturated carboxylic acid monomer. The desirable content of unsaturated carboxylic acid monomer is 1 to 20 weight %, more desirably 2 to 10 weight %. If less than 1 weight %, the soldering-heat resistance may not be sufficient. If more than 20 weight %, deterioration of processibility for injection molding, and impact resistance may occur, and other unexpected problems may arise.

As for the compound that has a carbon-carbon unsaturated bond and amino group, a hydroxyl group, epoxy group, and thiol group, in the same molecule, the following examples can be shown: allylamine, diallylamine, 4-aminostyrene, 2-hydroxyethylacrylate, 2-hydroxyethylmethacrylate, allyl alcohol, ethyleneglycol monomethacrylate, diethyleneglycol monomethacrylate, trimethylolpropane monomethacrylate, trimethylolpropane dimethacrylate, p-hydroxystyrene, m-hydroxystyrene, and ethyl-α-hydroxymethyl methacrylate, glycidylmethacrylate, 4-mercaptostyrene.

As for the ratio of (a) the styrene-based copolymer having a carboxyl acid group to (b), the compound that has a carbon-carbon unsaturated bond and amino group, hydroxyl group, epoxy group, and thiol group in the same molecule, the desirable ratio of compound (b) is in a range of 1 to 30 parts by weight per 100 parts by weight of styrene based copolymer (a), when the content of the carboxyl acid group in the styrene-based polymer (a) is 1 to 20 weight %. If less than 1 part by weight, the soldering-heat resistance may not be sufficient. If more than 30 weight parts, the processibility for molding may decrease and the price may become undesirable.

Item ④ specifies polyphenylene ether having an acid anhydride group. The polymer can be synthesized by the known method of chemically modification for the molecular terminal of the polyphenylene ether to introduce an acid anhydride group such as maleic anhydride.

As for the organic compound that has in the same molecule both (a) a polymerizing functional group selected from the groups consisting of vinyl group, allyl group, acrylic group, and methacrylic group and (b) a functional group selected from the groups consisting of amino group, epoxy group, and hydroxyl group, the following examples can be shown: aminoethyl vinyl ether, 4-aminostyrene, 4-hydroxystyrene, allylamine, diallylamine, glycidylacrylate, glycidylmethacrylate, and aminoethylmethacrylate. In these examples, it is desirable to use a compound that has a methacrylic group and an epoxy group in the same molecule, such as glycidylmethacrylate, because it has better processibility of melt-mixing. The desirable amount of organic compound is in a range of 0.1 to 20 parts by weight per 100 parts by weight of the polyphenylene ether having an acid anhydride group, more desirably 0.5 to 10 parts by weight. If less than 0.1 parts by weight, the cross-linking degree may be insufficient to meet the required soldering-heat resistance. Even if the added amount exceeds 20 parts by weight, a better result cannot be obtained. Moreover, the processibility of melt-mixing and injection molding may be decrease.

Item ⑤ specifies polybutyleneterephthalate. As for the organic compound that is to be added to the polybutyleneterephthalate and that has in the same molecule both (a) a polymerizing functional group selected from the groups consisting of vinyl group, allyl group, acrylic group, and methacrylic group and (b) a functional group selected from the groups consisting of amino group, carboxylic acid group, epoxy group, and hydroxyl group, the following examples can be shown: 4-hydroxystyrene, 4-aminostyrene, allyl phenol, acrylic acid, glycidylacrylate, methacrylic acid, glycidylmethacrylate, aminoethylmethacrylate, 2-acryloyloxyethylsuccinate, 2-acryloyloxyethyl phthalate, 2-methacryloyloxyethylsuccinate, and 2-methacryloyloxyethyl phthalate. In these examples, it is desirable to use a compound that has in the same molecule (a) a methacrylic group and (b) either a carboxylic acid group or an epoxy group, such as methacrylic acid and glycidylmethacrylate, because it has better processibility of melt-mixing with the polybutyleneterephthalate. The desirable amount of organic compound to be added is in a range of 0.1 to 20 parts by weight per 100 parts by weight of the polybutyleneterephthalate, more desirably 0.5 to 10 parts by weight. If less than 0.1 parts by weight, the cross-linking may be insufficient to meet the required soldering-heat resistance. Even if the added amount exceeds 20 parts by weight, a better result cannot be obtained. Moreover, the processibility of melt-mixing and injection molding may decrease.

Item ⑥ specifies polyamide resin. As for the organic compound that is to be added to the polyamide resin, such as nylon 6, nylon 6,6, nylon 6,12, or nylon 6T, and that has in the same molecule both (a) a polymerizing functional group selected from the groups consisting of vinyl group, allyl group, acrylic group, of epoxy group and carboxylic acid group, the following examples can be it shown: acrylic acid, glycidylacrylate, methacrylic acid, glycidyl methacrylate, 2-acryloyloxyethylsuccinate, 2-acryloyloxyethyl phthalate, 2-methacryloyloxyethyl succinate, and 2-methacryloyloxyethyl phthalate. In these examples, it is desirable to use a compound that has a methacrylic group and an epoxy group in the same molecule, such as glycidylmethacrylate. The desirable amount of organic compound to be added is in a range of 0.1 to 20 parts by weight per 100 parts by weight of the polyamide resin, more desirably 0.5 to 10 parts by weight. If less than 0.1 parts by weight, the cross-linking degree may be insufficient to meet the required soldering-heat resistance. Even if the added amount exceeds 20 parts by weight, a better result cannot be obtained. Moreover, the processibility of melt-mixing may decrease.

As for the monomers which reacts with polyesters for item ⑦, it can be shown that monomers which contains carboxyl acid group, acid anhydride group, epoxy group, oxazoline group, carbodiimide group, isocyanate group, hydroxyl group, silanol group, etc. In particular, it is desirable to use the monomers such as maleic anhydride, glycidylmethacrylate, acrylic acid, methacrylic acid and so on.

Item ⑧ specifies a monomer that reacts with polyamide. As for the organic compound to be added to polyamide, the monomers containing carboxylic acid group, acid anhydride group, epoxy group, oxazoline group, carbodiimide group, isocyanate group, hydroxyl group, silanol group, etc can be shown as examples. In particular, it is desirable to use the monomers of maleic anhydride, glycidylmethacrylate, acrylic acid, methacrylic acid, etc.

Item ⑨ specifies a monomer that reacts with an acid anhydride group of polyphenylene ether. As for the organic compound to be added to the acid anhydride group modified polyphenylene ether, the monomers containing amino group and epoxy group are exemplified as desirable ones.

The foregoing monomers may be graft-polymerized or copolymerized with general-purpose polyolefin, without any specific limitations, such as polyethylene, ethylene-vinyl acetate copolymer (EVA), ethylene-ethylacrylate copolymer (EEA), ethylene-octene copolymer, ethylene-propylene copolymer, ethylenebutene copolymer, ethylene-hexene copolymer, or ethylene-propylene-diene terpolymer.

Amorphous engineering plastics including polyphenylene ether, polystyrene, and styrene-acrylonitrile copolymer are generally advantageous for small shrinkage in injection molding process, and their molded products have small warp and small anisotropy in mechanical properties. However, they have some disadvantages such as stress-cracking in solvents. On the other hand, crystalline engineering plastics including polybutyleneterephthalate and polyamide are advantageous in that they are excellent in solvent resistance and stress-cracking and are suitable for thin wall injection molding. They are, however, disadvantageous in that they have large molding shrinkage and the molded products apt to warp.

In order to obtain a balance between the processibility in injection molding and the physical properties, researchers and engineers have conducted intensive studies on polymer alloys of amorphous engineering plastics and crystalline engineering plastics. Typical examples of these polymer alloys include a polymer alloy of polyphenylene ether and polybutyleneterephthalate and a polymer alloy of polyphenylene ether and polyamide, which are already in practical use.

However, these engineering plastic-based alloys are not sufficient in heat resistance. None of them satisfies a soldering-heat resistance test even at 240° C. specification. Therefore, they cannot be used to the applications that require a soldering-heat resistance of a 260° C. specification.

The present invention is effective for improvement of the soldering heat-resistance of these polymer alloys as well. More specifically, all of the following combinations can be used to obtain heat-resistant polymer alloys: a polyphenylene ether-based resin composition of Item ④ and a polybutyleneterephthalate based resin composition of Item ⑤, a polyphenylene ether based resin composition of Item ④ and a polyamide based resin composition of Item ⑥, a polyphenylene ether based resin composition of Item ⑨ and a polybutyleneterephthalate based resin composition of Item ⑦, and a polyphenylene ether based resin composition of Item ⑨ and a polyamide based resin composition of Item ⑧. Polymer alloys combine good processibility in injection molding and physical properties, such as stress-cracking and solvent resistance. In addition, they can be cross-linked by ionizing radiation to obtain molded products that can satisfy the soldering-heat resistance of a 260° C. specification.

The above-described composites of the present invention can be further combined with multifunctional monomers to obtain plastic compositions that have further enhanced soldering heat resistance and heat aging property. More specifically, they satisfy a soldering-heat resistance of 280° C. specification and heat aging test of 140° C. for seven days. If necessary, known chemicals, such as a coloring agent, lubricant, a stabilizer, an antioxidant, a flame retardant, and a cross-linking promoter, may be added to the compositions of the present invention.

The compositions of the present invention can be produced by using a known mixing machine, such as single screw or a twin screw extruder type of melt mixers. The materials for the compositions can be molded by using a known injection molding machine.

The molded products can be irradiated not only by γ-rays from cobalt 60, but also by X-rays and α-rays. When accelerated electron beams are used for the irradiation, the accelerating voltage can be adjusted in accordance with the thickness of the molded product.

BEST MODE FOR CARRYING OUT THE INVENTION

Further details of the present invention is explained by referring to the following Examples and Comparative Examples.

EXAMPLE 1

The following materials were pre-blended at room temperature using a super mixer: (a) 100 parts by weight of a styrene-maleic anhydride copolymer (melt flow rate: 1.5 at 190° C. and under a load of 2,160 kg; maleic anhydride content: 5 mol %), (b) 5 parts by weight of glycidylmethacrylate as an organic compound that has a polymerizing functional group and an epoxy group in the same molecule, and (c) 0.3 parts by weight of an antioxidant (commercial name: Irganox1010, Ciba). The pre-blended materials were fed into a twin screw extruder (diameter: 40 mm; L/D: 42) setting barrel temperature at 220° C., die temperature at 240° C., and screw rotation at 50 rpm. The melt-kneaded material was strand-cut to obtain pellets of the styrene-based resin composition. The pellets were molded using an injection molding machine (metal mold clamping force: 180 tons; screw diameter: 45 mm) setting barrel temperature at 220° C., injection pressure at 100 kg/cm$^2$, pressure-holding time at 15 seconds, and metal mold temperature at 60° C. to obtain test pieces of 1.0 mm thickness having a shape stipulated as Type JIS 3 (JIS stands for the Japanese Industrial Standard). The test pieces were irradiated with γ-rays from cobalt 60 until they absorbed 150 kGy to obtain test samples.

A group of test samples was immersed in a tin-lead-alloy solder bath at 260° C. for 10 sec; another group, for 30 sec; and yet another group, for 60 sec.

The test results demonstrated that every sample showed no deformation or swelling, proving the excellent soldering-heat resistance of the test samples.

Another group of test samples was subjected to a tensile strength test. The tensile strength of original sample was 360 kg/cm$^2$, and the tensile strength of 7 days heat aged sample at 120° C. was 290 kg/cm$^2$. This results demonstrated that both original and heat aged samples showed excellent mechanical strength.

COMPARATIVE EXAMPLE 1-1

The following materials were pre-blended at room temperature using a super mixer: (a) 100 parts by weight of the same styrene-maleic anhydride copolymer as used in Example 1, (b) 10 parts by weight of triallyl isocyanurate as a cross-linking promoter, and (c) 0.3 parts by weight of an antioxidant (Irganox1010). The pre-blended materials were fed into a twin screw extruder (diameter: 40 mm; L/D: 42) setting barrel temperature at 220° C., die temperature at 240° C., and screw rotation at 50 rpm. The melt-kneaded material was strand-cut to obtain pellets of the styrene-based resin composition. The pellets were molded with an injection molding machine (metal mold clamping force: 100 tons; screw diameter: 45 mm) setting barrel temperature at 220° C., injection pressure at 100 kg/cm$^2$, pressure-holding time at 15 sec, and metal-mold temperature at 60° C. to obtain test pieces of 1.0 mm thickness having a shape stipulated as Type JIS 3. The test pieces were irradiated with γ-rays from cobalt 60 until they absorbed 150 kGy to obtain test samples. The test sample melted down by 10 seconds immersion in a tin-lead-alloy solder bath at 260° C.

COMPARATIVE EXAMPLE 1-2

The following materials were pre-blended at room temperature using a super mixer: (a) 100 parts by weight of polystyrene (melt flow rate: 2 at 190° C. and under a load of 2,160 kg), (b) 10 parts by weight of triallyl cyanurate as a cross-linking promoter, and (c) 0.3 weight parts of an antioxidant (Irganox1010). The pre-blended materials were fed into a twin screw extruder (diameter: 40 mm; L/D: 42) setting barrel temperature at 240° C., die temperature at 240° C., and screw rotation at 50 rpm. The melt-kneaded material was strand-cut to obtain pellets of the styrene-based resin composition. The pellets were molded with an injection molding machine (metal mold clamping force: 100 tons; screw diameter: 45 mm) setting barrel temperature at 240° C., injection pressure at 100 kg/cm$^2$, pressure-holding time at 10 sec, and metal-mold temperature at 60° C. to obtain test pieces of 1.0 mm thickness having a shape stipulated as Type JIS 3. The test pieces were irradiated with γ-rays from cobalt 60 until they absorbed 150 kGy to obtain test samples. The test sample melted down by 10 seconds immersion in a tin-lead-alloy solder bath at 260° C.

EXAMPLE 2

The following materials were pre-blended at room temperature with a super mixer: (a) 100 parts by weight of styrene-2-propenyloxazoline copolymer (melt flow rate: 3 at 190° C. and under a load of 2,160 kg; 2-propenyloxazoline content: 3 mol %), (b) 5 parts by weight of 2-methacryloyloxyethylsuccinate as an organic compound that has a polymerizing functional group and a carboxylic acid group in the same molecule, and (c) 0.5 parts by weight of an antioxidant (Irganox1010). The pre-blended materials were fed into a twin screw extruder (diameter: 40 mm; L/D: 42) setting barrel temperature at 200° C., die temperature at 200° C., and screw rotation at 50 rpm. The melt-kneaded material was strand-cut to obtain pellets of the styrene-based resin composition. The pellets were molded with an injection molding machine (metal mold-clamping force: 100 tons; screw diameter: 45 mm) setting barrel temperature at 200° C., injection pressure at 80 kg/cm$^2$, pressure-holding time at 10 sec, and metal-mold temperature at 50° C. to obtain test pieces of 1.0 mm thickness having a shape stipulated as Type JIS 3. The test pieces were irradiated with electron beam at accelerating voltage of 3 MeV until they absorbed 200 kGy to obtain test samples.

A group of test samples was immersed in a tin-lead-alloy solder bath at 260° C. for 10 sec; another group, for 30 sec; and yet another group, for 60 sec. The test results demonstrated that every sample showed no deformation or swelling, proving excellent soldering-heat resistance of the test samples.

Another group of test samples was subjected to a tensile strength test. The original sample showed 280 kg/cm$^2$, and the tensile strength of 7 days heat aged sample at 120° C. showed 280 kg/cm$^2$. The results demonstrated that both original and heat aged samples have excellent mechanical strength.

COMPARATIVE EXAMPLE 2

The following materials were pre-blended at room temperature using a super mixer: (a) 100 parts by weight of the same styrene-2-propenyloxazoline copolymer as used in Example 2, (b) 10 parts by weight of triallyl isocyanurate as a cross-linking promoter, and (c) 0.5 parts by weight of an antioxidant (Irganox1010). The pre-blended materials were fed into a twin screw extruder (diameter: 40 mm; L/D: 42) setting barrel temperature at 220° C., die temperature at 220° C., and screw rotation at 50 rpm. The melt-kneaded material was strand-cut to obtain pellets of the styrene based resin composition. The pellets were molded with an injection molding machine (metal mold-clamping force: 100 tons; screw diameter: 45 mm) setting barrel temperature at 220° C., injection pressure at 80 kg/cm$^2$, pressure-holding time at 10 sec, and metal-mold temperature at 60° C. to obtain test pieces of 1.0 mm thickness having a shape stipulated as Type JIS 3. The test pieces were irradiated with electron beam at accelerating voltage of 3 MeV until they absorbed 200 kGy to obtain test samples. The test sample melted down by 10 seconds immersion in a tin-lead-alloy solder bath at 260° C.

EXAMPLE 3-1

The following materials were pre-blended at room temperature using a super mixer: (a) 100 parts by weight of a styrene-methacrylic acid copolymer as a styrene based polymer having a carboxylic acid group, (b) 10 parts by weight of 2-hydroxyethylmethacrylate as an organic compound that has a carbon-carbon unsaturated bond and a hydroxyl group in the same molecule, (c) 0.3 parts by weight of 2,6-di-t-butyl-4-methylphenol as a polymerization inhibitor, and (d) 1 part by weight of as an antioxidant(Irganox1010). The pre-blended materials were fed into a twin screw extruder (diameter: 30 mm; L/D: 30) setting barrel temperature at 265° C. and screw rotation at 50 rpm. The melt-kneaded material was strand-cut to obtain pellets of the styrene-based resin composition.

The obtained pellets were dried in a thermostatic oven at 70° C. for 24 hours. Subsequently, the pellets were molded with an injection molding machine (metal mold clamping force of 40 tons) setting barrel temperature at 260° C., pressure-holding time at 10 sec, and metal-mold temperature at 70° C. to obtain test pieces, with a thickness of 1 mm having a shape stipulated as Type JIS 3. The test pieces were irradiated with electron beam at accelerating voltage of 2 MeV until they absorbed 200 kGy to obtain test samples.

A group of test samples was immersed in a bath of tin-lead-alloy solder at 260° C. for 10 sec; another group, for 30 sec; and yet another group, for 60 sec. The test results demonstrated that every sample showed no deformation or swelling, proving excellent soldering-heat resistance of the test samples.

Another group of test samples was subjected to a tensile strength test. The original sample showed 280 kg/cm$^2$, and the tensile strength of 7 days heat aged sample at 120° C. was 280 kg/cm$^2$. The results demonstrated that both original and heat aged samples have excellent mechanical strength.

EXAMPLE 3-2

The following materials were pre-blended at room temperature using a super mixer: (a) 100 parts by weight of a styrene-acrylonitrile-methacrylic acid copolymer as a styrene based polymer having a carboxylic acid group, (b) 10 parts by weight of 2-hydroxyethylmethacrylate as an organic compound that has a carbon-carbon unsaturated bond and a hydroxyl group in the same molecule, (c) 0.3 parts by weight of 2,6-di-t-butyl-4-methylphenol as a polymerization inhibitor, and (d) 1 part by weight of Irganox1010 as an antioxidant. The pre-blended materials were fed into a twin screw extruder (diameter: 30 mm; L/D: 30) setting barrel temperature at 265° C. and screw rotation at 50 rpm. The melt-kneaded material was strand-cut to obtain pellets of the styrene-based resin composition.

The obtained pellets were dried in a thermostatic oven at 70° C. for 24 hours. Subsequently, the pellets were molded with an injection molding machine (metal mold clamping force of 40 tons) setting barrel temperature at 260° C., pressure-holding time at 10 sec, and metal-mold temperature at 70° C. to obtain test pieces of 1 mm thickness having a shape stipulated as Type JIS 3. The test pieces were irradiated with electron beam at accelerating voltage of 2 MeV until they absorbed 200 kGy to obtain test samples.

A group of test samples was immersed in a tin-lead-alloy solder bath at 260° C. for 10 secs.; another group, for 30 secs.; and yet another group, for 60 secs. The test results demonstrated that every sample showed no deformation or swelling, proving excellent soldering-heat resistance of the test samples.

Another group of test samples was subjected to a tensile strength test. The original sample showed 280 kg/cm$^2$, and the tensile strength of 7 days heat aged sample at 120° C. was 280 kg/cm$^2$. The results demonstrated both original and heat aged samples have excellent mechanical strength.

COMPARATIVE EXAMPLE 3-1

The following materials were pre-blended at room temperature using a super mixer: (a) 100 parts by weight of the same styrene-methacrylic acid copolymer as used in Example 3-1 and (b) 10 parts by weight of trimethyrolpropanetrimethacrylate as a cross-linking promoter. The pre-blended materials were fed into a twin screw extruder (diameter: 30 mm; L/D: 30) setting barrel temperature at 230° C. and screw rotation at 50 rpm. The melt-kneaded material was strand-cut to obtain pellets.

The obtained pellets were dried in a thermostatic oven at 70° C. for 24 hours. Subsequently, the pellets were molded with an injection molding machine (metal mold-clamping force of 40 tons) setting barrel temperature at 260° C., pressure-holding time at 10 sec, and metal-mold temperature at 70° C. to obtain test pieces of 1 mm thickness having a shape stipulated as Type JIS 3. The test pieces were irradiated with electron beam at accelerating voltage of 2 MeV until they absorbed 200 kGy to obtain test samples. When a test sample was subjected to a test of soldering-heat resistance, the test sample melted and deformed under a condition of 260° C. for 60 seconds. The result shows insufficient heat resistance of the test sample.

COMPARATIVE EXAMPLE 3-2

The following materials were pre-blended at room temperature using a super mixer: (a) 100 parts by weight of the same styrene-acrylonitrile-methacrylic acid copolymer as used in Example 3-2 and (b) 10 parts by weight of trimethyrolpropanetrimethacrylate as cross-linking promoter. The pre-blended materials were fed into a twin screw extruder (diameter: 30 mm; L/D: 30) setting barrel temperature at 230° C. and screw rotation at 50 rpm. The melt-kneaded material was strand-cut to obtain pellets.

The obtained pellets were dried in a thermostatic oven at 70° C. for 24 hours. Subsequently, the pellets were molded with an injection molding machine (metal mold-clamping force of 40 tons) setting barrel temperature at 260° C., pressure-holding time at 10 sec, and metal-mold temperature at 70° C. to obtain test pieces of 1 mm thickness having a shape stipulated as Type JIS 3. The test pieces were irradiated with electron beam at accelerating voltage of 2 MeV until they absorbed 200 kGy to obtain test samples. When a test sample was subjected to a test of soldering-heat resistance, the test sample melted and deformed under a condition of 260° C. for 60 seconds. The result shows insufficient heat resistance of the test sample.

EXAMPLE 4

(a1) Polyphenylene ether having a maleic anhydride group with an amount of 1 weight % and (a2) polystyrene at a ratio of 80:20 by weight were pre-mixed with a super-mixer at room temperature to make resin mixture (a). 100 parts by weight of (a) and (b) 3 parts by weight of glycidyl-methacrylate as an organic compound that has a polymerizing functional group and an epoxy group in the same molecule, and (c) 1 part by weight of an antioxidant (Irganox1010). The pre-blended materials were fed into a twin screw extruder (diameter: 40 mm; L/D: 42) setting barrel temperature at 280° C., die temperature at 290° C., and screw rotation at 50 rpm. The melt-kneaded material was strand-cut to obtain pellets of the polyphenylene ether and polystyrene based resin composition. The pellets were molded with an injection molding machine (metal mold clamping force: 100 tons; screw diameter: 45 mm) setting barrel temperature at 280° C., injection pressure at 100 kg/cm$^2$, pressure-holding time at 15 sec, and metal-mold temperature at 80° C. to obtain test pieces of 1.0 mm thickness having a shape stipulated as Type JIS 3. The test pieces were irradiated with electron beam at accelerating voltage of 3 MeV until they absorbed 200 kGy to obtain test samples.

A group of test samples was immersed in a tin-lead-alloy solder bath at 260° C. for 10 secs.; another group, for 30 secs.; and yet another group, for 60 secs. The test results demonstrated that every sample showed no deformation or swelling, proving excellent soldering-heat resistance of the test samples.

Another group of test samples was subjected to tensile strength test. The original sample showed strength of 330 kg/cm$^2$, and the 7 days heat aged sample at 120° C. for 7 days showed a strength of 270 kg/cm$^2$. The results demonstrated both original and heat aged samples have excellent mechanical strength.

COMPARATIVE EXAMPLE 4-1

The following materials were pre-blended at room temperature with a super mixer: (a) 100 parts by weight of the same modified polyphenylene ether as used in Example 4, (b) 15 parts by weight of triallyl isocyanurate as a cross-linking promoter, and (c) 1 part by weight of an antioxidant (Irganox1010). The pre-blended materials were fed into a twin screw extruder (diameter: 40 mm; L/D: 42) setting barrel temperature at 280° C., die temperature at 290° C., and screw rotation at 50 rpm. The melt-kneaded material was strand-cut to obtain pellets of the polyphenylene ether-based resin composition. The pellets were molded with an injection molding machine (metal mold clamping force: 100 tons; screw diameter: 45 mm) setting barrel temperature at 290° C., injection pressure of 100 kg/cm$^2$, pressure-holding time at 15 sec, and metal-mold temperature at 80° C. to obtain test pieces of 1.0 mm thickness having a shape stipulated as Type JIS 3. The test pieces were irradiated with electron beam at accelerating voltage of 3 MeV until they absorbed 200 kGy to obtain test samples. The test sample melted down by 10 seconds immersion in a tin-lead-alloy solder bath at 260° C.

COMPARATIVE EXAMPLE 4-2

The following materials were pre-blended at room temperature using a super mixer: (a) 100 parts by weight of the pellets of a blended material (specific gravity: 1.07; deformation temperature: 170° C. by ASTM D 648) obtained by melt-kneading of polyphenylene ether and polystyrene at a ratio of 80:20 by weight, (b) 15 parts by weight of triallyl isocyanurate as a cross-linking promoter, and (c) 1 part by weight of an antioxidant (Irganox1010). The pre-blended materials were fed into a twin screw extruder (diameter: 40 mm; L/D: 42) setting barrel temperature at 280° C., die temperature at 290° C., and screw rotation at 50 rpm. The melt-kneaded material was strand-cut to obtain pellets of the polyphenylene ether and polystyrene based resin composition. The pellets were molded with an injection molding machine (metal mold clamping force: 100 tons; screw diameter: 45 mm) setting barrel temperature at 280° C., injection pressure at 100 kg/cm$^2$, pressure-holding time at 15 secs., and metal-mold temperature at 80° C. to obtain test pieces of 1.0 mm thickness having a shape stipulated as Type JIS 3. The test pieces were irradiated with electron beam at accelerating voltage of 3 MeV until they absorbed 200 kGy to obtain test samples. The test sample melted down by 10 seconds immersion in a tin-lead-alloy solder bath at 260° C.

EXAMPLE 5-1

The following materials were pre-blended at room temperature using a super mixer: (a) 100 parts by weight of polybutyleneterephthalate (melting point: 224° C.; specific gravity: 1.31), (b) 5 parts by weight of glycidyl methacrylate as an organic compound that has a polymerizing functional group and an epoxy group in the same molecule, and (c) 0.5 parts by weight of an antioxidant (Irganox1010). The pre-blended materials were fed into a twin screw extruder (diameter: 40 mm; L/D: 42) setting barrel temperature at 260° C., die temperature at 260° C., and screw rotation at 50 rpm. The melt-kneaded material was strand-cut to obtain pellets of the polybutyleneterephthalate based resin composition. The pellets were molded with an injection molding machine (metal mold clamping force: 100 tons; screw diameter: 45 mm) setting barrel temperature of 260° C., injection pressure at 80 kg/cm$^2$, pressure-holding time at 15 secs., and metal-mold temperature at 70° C. to obtain test pieces of 1.0 mm thickness having a shape stipulated as Type JIS 3. The test pieces were irradiated with electron beam at accelerating voltage of 3 MeV until they absorbed 200 kGy to obtain test samples.

A group of test samples was immersed in a tin-lead-alloy solder bath at 260° C. for 10 secs.; another group, for 30 secs.; and yet another group, for 60 secs. The test results demonstrated that every sample showed no deformation or swelling, proving excellent soldering-heat resistance of the test samples.

Another group of test samples was subjected to a tensile strength test. The original test sample showed 410 kg/cm$^2$, demonstrating excellent mechanical strength of the test sample. Another test sample was heat aged with a gear oven for 7 days at 120° C., and was subjected to measure the tensile strength. The test result was 380 kg/cm$^2$, which was close to the initial value, demonstrating excellent heat-aging resistance of the test sample as well.

EXAMPLE 5-2

The following materials were pre-blended at room temperature using a super mixer: (a) 100 parts by weight of PBT (specific gravity: 1.31; melting point: 224° C., (b) 5 parts by weight of 2-hydroxyethylmethacrylate as an organic compound that has a polymerizing functional group and a hydroxyl group in the same molecule, (c) 0.25 parts by weight of 2,6-di-t-butyl-4-methylphenol as a polymerization inhibitor, and (d) 1 part by weight of Irganox1010 as an antioxidant. The pre-blended materials were fed into a twin screw extruder (diameter: 40 mm; L/D: 42) setting barrel temperature at 270° C., die temperature at 260° C., and screw rotation at 50 rpm. The melt-kneaded material was strand-cut to obtain. The pellets were molded with an injection molding machine (metal mold clamping force: 100 tons; screw diameter: 45 mm) setting barrel temperature at 260° C., injection pressure at 80 kg/cm$^2$, pressure-holding time at 10 sec, and metal-mold temperature at 70° C. to obtain test pieces of 1.0 mm thickness having a shape stipulated as Type JIS 3. The test pieces were irradiated with electron beam at accelerating voltage of 3 MeV until they absorbed 200 kGy to obtain test samples.

A group of test samples was immersed in a tin-lead-alloy solder bath at 260° C. for 10 secs.; another group, for 30 secs.; and yet another group, for 60 secs. The test results demonstrated that every sample showed no deformation or swelling, proving excellent soldering-heat resistance of the test samples.

Another group of test samples was subjected to a tensile strength test. The original sample showed 440 kg/cm$^2$, demonstrating excellent mechanical strength of the test sample. The tensile strength of 7 days heat aged sample at 120° C. was 340 kg/cm$^2$, which was close to the initial value, demonstrating excellent heat-aging resistance of the test sample as well.

EXAMPLE 5-3

The following materials were pre-blended at room temperature using a super mixer: (a) 100 parts by weight of PBT (specific gravity: 1.31; melting point: 224° C.), (b) 5 parts by weight of β-methacryloyloxyethylsuccinate (refractive index: 1.463; chemical formula: $CH_2=C(CH_3)-COOCH_2CH_2-OOC-CH_2CH_2-COOH$) as a compound that has a polymerizing functional group and a carboxylic acid group in the same molecule, (c) 0.3 parts by weight of 2,6-di-t-butyl-4-methylphenol as a polymerization inhibitor, and (d) 1 part by weight of Irganox1010 as an antioxidant. The pre-blended materials were fed into a twin screw extruder (diameter: 40 mm; L/D: 42) setting barrel temperature at 260° C., die temperature at 260° C., and screw rotation at 50 rpm. The melt-kneaded material was strand-cut to obtain pellets of the resin composition. The pellets were molded with an injection molding machine (mold-clamping force: 100 tons; screw diameter: 45 mm) setting barrel temperature at 260° C., injection pressure at 80 kg/cm$^2$, pressure-holding time at 10 sec, and metal-mold temperature at 70° C. to obtain test pieces of 1.0 mm thickness having a shape stipulated as Type JIS 3. The test pieces were irradiated with electron beams at accelerating voltage of 3 MeV until they absorbed 250 kGy to obtain test samples.

A group of the test samples was immersed in a bath of tin-lead-alloy solder at 260° C. for 10 secs.; another group, for 30 secs.; and yet another group, for 60 secs. The test results demonstrated that every sample showed no deformation or swelling, proving excellent soldering-heat resistance of the test samples.

Another group of test samples was subjected to a tensile strength test. The original sample showed 420 kg/cm$^2$, demonstrating excellent mechanical strength of the test sample. The tensile strength of 7 days heat aged sample at 120° C. was 390 kg/cm$^2$, which was close to the initial value, demonstrating excellent heat-aging resistance of the test sample as well.

EXAMPLE 5-4

The following materials were pre-blended at room temperature with a super mixer: (a) 100 parts by weight of PBT (specific gravity: 1.31; melting point: 224° C.), (b) 5 parts by weight of 4-amino-styrene as an organic compound that has a polymerizing functional group and an amino group in the same molecule, (c) 0.5 parts by weight of 2,6-di-t-butyl-4-methylphenol as a polymerization inhibitor, and (d) 1 part weight of Irganox1010 as an antioxidant. The pre-blended materials were fed into a twin screw extruder (diameter: 40 mm; L/D: 42) setting barrel temperature at 260° C., die temperature at 260° C., and screw revolution at 50 rpm. The melt-kneaded material was strand-cut to obtain pellets of the resin composition. The pellets were molded with an injection molding machine (mold-clamping force: 100 tons; screw diameter: 45 mm) setting barrel temperature at 260° C., injection pressure at 80 kg/cm$^2$, pressure-holding time at 10 sec. and metal-mold temperature at 70° C. to obtain test pieces of 1.0 mm thickness having a shape stipulated as Type JIS 3. The test pieces were irradiated with electron beam at accelerating voltage of 3 MeV until they absorbed 200 kGy to obtain test samples.

A group of test samples was immersed in a bath of tin-lead-alloy solder at 260° C. for 10 secs.; another group, for 30 secs.; and yet another group, for 60 secs. The test results demonstrated that every sample showed no deformation or swelling, proving excellent in soldering-heat resistance of the test samples.

Another group of test samples was subjected to a tensile strength test. The original sample showed 380 kg/cm$^2$, demonstrating excellent mechanical strength of the test sample. The tensile strength of 7 days heat aged sample at 120° C. was 390 kg/cm$^2$, which was close to the initial value, demonstrating excellent heat-aging resistance of the test sample as well.

COMPARATIVE EXAMPLE 5

The following materials were pre-blended at room temperature using a super mixer: (a) 100 parts by weight of polybutyleneterephthalate, (b) 5 parts by weight of triallyl isocyanurate as a cross-linking promoter, and (c) 0.5 parts by weight of an antioxidant (Irganox1010). The pre-blended materials were fed into a twin screw extruder (diameter: 40 mm; L/D: 42) setting barrel temperature at 260° C., die temperature at 260° C., and screw rotation at 50 rpm. The melt-kneaded material was strand-cut to obtain pellets of the polybutyleneterephthalate based resin composition. The pellets were molded with an injection molding machine (metal mold-clamping force: 100 tons; screw diameter: 45 mm) setting barrel temperature at 260° C., injection pressure at 80 kg/cm$^2$, pressure-holding time at 15 secs., and metal-mold temperature at 70° C. to obtain test pieces of 1.0 mm thickness having a shape stipulated as Type JIS 3. The test pieces were irradiated with electron beam at accelerating voltage of 3 MeV until they absorbed 100 kGy to obtain test samples. A group of the test samples was immersed in a tin-lead-alloy solder bath at 260° C. for 10 secs.; another group, for 30 secs.; and yet another group, for 60 secs. The test results showed that the samples tested for 10 secs. and for 30 secs. deformed slightly and the samples tested for 60 secs. melted and deformed significantly. The results show insufficient soldering-heat resistance of the test samples.

Another group of test samples was provided by irradiating test pieces with electron beam until they absorbed 300 kGy. To examine the soldering-heat resistance, a group of test samples was immersed in a tin-lead-alloy solder bath at 260° C. for 10 secs; another group, for 30 secs.; and yet another group for 60 secs. The test results showed that the samples tested for 10 secs. showed no deformation or swelling, the samples tested for 30 secs. deformed slightly, and the samples tested for 60 secs. melted. Test samples provided by irradiating electron beams with an absorbed dose of 300 kGy were also subjected to a tensile strength test. An original sample showed a strength of 350 kg/cm$^2$, and an excellent property in mechanical strength. However, the heat aged sample in a gear oven at 120° C. for 7 days showed a strength of 170 kg/cm$^2$, about one-half of the initial value. This result showed that the test samples irradiated with an absorbed dose of 300 kGy were poor in heat-aging resistance.

EXAMPLE 6

The following materials were pre-blended at room temperature with a super mixer: (a) 100 parts by weight of nylon 6,6 (melting point: 260° C.; specific gravity: 1.15), (b) 5 parts by weight of glycidylmethacrylate as an organic compound that has a polymerizing functional group and an epoxy group in the same molecule, and (c) 0.5 parts by weight of an antioxidant (Irganox1010). The pre-blended materials were fed into a twin screw extruder (diameter: 40 mm; L/D: 42) setting barrel temperature at 280° C., die temperature at 290° C., and screw rotation at 50 rpm. The melt-kneaded material was strand-cut to obtain pellets of the nylon 6,6-based resin composition. The pellets were molded with an injection molding machine (metal mold-clamping force: 100 tons; screw diameter: 45 mm) setting barrel temperature at 280° C., injection pressure at 100 kg/cm², pressure-holding time at 15 secs., and metal-mold temperature at 60° C. to obtain test pieces of 1.0 mm thickness having a shape stipulated as Type JIS 3. The test pieces were irradiated with electron beam at accelerating voltage of 3 MeV until they absorbed 100 kGy to obtain test samples.

A group of test samples was immersed in a tin-lead-alloy solder bath at 260° C. for 10 secs.; another group, for 30 secs.; and yet another group, for 60 secs. The test results demonstrated that every sample showed no deformation or swelling, proving excellent soldering-heat resistance of the test samples.

Another group of test samples was subjected to a tensile strength test after being dried in a thermostatic oven for 2 hours at 120° C. The original test sample showed 420 kg/cm², demonstrating excellent mechanical strength of the test sample. The tensile strength of 7 days heat aged sample at 120° C. was 380 kg/cm², which was close to the initial value, demonstrating excellent heat-aging resistance of the test sample as well.

COMPARATIVE EXAMPLE 6

The following materials were pre-blended at room temperature using a super mixer: (a) 100 parts by weight of the same nylon 6,6 as used in Example 6, (b) 5 parts by weight of triallyl cyanurate as a cross-linking promoter, and (c) 0.5 parts by weight of an antioxidant (Irganox1010). The pre-blended materials were fed into a twin screw extruder (diameter: 40 mm; L/D: 42) setting barrel temperature at 280° C., die temperature at 290° C., and screw rotation at 50 rpm. The melt-kneaded material was strand-cut to obtain pellets of the nylon-based resin composition. The pellets were molded with an injection molding machine (metal mold-clamping force: 100 tons; screw diameter: 45 mm) setting barrel temperature at 280° C., injection pressure at 100 kg/cm², pressure-holding time at 15 secs., and metal-mold temperature at 80° C. to obtain test pieces of 1.0 mm thickness having a shape stipulated as Type JIS 3. The test pieces were irradiated with electron beam at accelerating voltage of 3 MeV until they absorbed 100 kGy to obtain test samples. To examine the soldering-heat resistance, a group of test samples was dried in a thermostatic oven at 120° C. for 2 hours and then immersed in a tin-lead-alloy solder bath at 260° C. for 10 secs.; another group, for 30 secs.; and yet another group, for 60 sec. The test results showed that the samples tested for 10 secs. showed no deformation or swelling, the samples tested for 30 secs. deformed slightly, and the samples tested for 60 secs. deformed significantly. The results show insufficient soldering-heat resistance of the test samples.

Another group of test samples was provided by irradiating test pieces with electron beam until they absorbed 300 kGy. To examine the soldering-heat resistance, a group of test samples was immersed in a tin-lead-alloy solder bath at 260° C. for 10 secs.; another group, for 30 secs.; and yet another group, for 60 secs. The test results showed that every sample showed no deformation or swelling, proving excellent soldering-heat resistance of the test samples. Test samples provided by irradiating electron beam with an absorbed dose of 300 kGy were subjected to a tensile strength test after being dried in a thermostatic oven at 120° C. for 2 hours. The original sample showed 330 kg/cm², an excellent property in mechanical strength. However, the tensile strength of 7 days heat aged at 120° C. was only 80 kg/cm², resulting a considerable reduction in strength. This result showed poor heat-aging resistance of the test samples provided with an absorbed dose of 300 kGy.

EXAMPLE 7

The following materials were pre-blended at room temperature with a super mixer: (a) 70 parts by weight of polybutyleneterephthalate (melting point: 224° C.; specific gravity: 1.31), (b) 30 parts by weight of a ethylene-methylacrylate-glycidylmethacrylate copolymer (glycidylmethacrylate content 3 wt %, methylacrylate content 30 wt %, MI=9), and (c) 0.5 parts by weight of an antioxidant (Irganox1010). The pre-blended materials were fed into a twin screw extruder (diameter: 40 mm; L/D: 42) setting barrel temperature at 260° C., die temperature at 260° C., and screw rotation at 50 rpm. The melt-kneaded material was strand-cut to obtain pellets of the polybutyleneterephthalate-based resin composition. The pellets were molded with an injection molding machine (metal mold clamping force: 100 tons; screw diameter: 45 mm) setting barrel temperature at 260° C., injection pressure at 80 kg/cm², pressure-holding time at 15 sec, and metal-mold temperature at 70° C. to obtain test pieces of 1.0 mm thickness having a shape stipulated as Type JIS 3. The test pieces were irradiated with electron beam at accelerating voltage of 3 MeV until they absorbed 100 kGy to obtain test samples.

A group of test samples was immersed in a tin-lead-alloy solder bath at 260° C. for 10 secs.; another group, for 30 secs.; and yet another group, for 60 secs. The test results demonstrated that every sample showed no deformation or swelling, proving excellent soldering-heat resistance of the test samples.

Another group of test samples was subjected to a tensile strength test. An original test sample showed 410 kg/cm², demonstrating excellent mechanical strength of the test sample. The tensile strength of 7 days heat aged sample was 380 kg/cm², which was close to the initial value, demonstrating excellent heat-aging resistance of the test sample as well.

COMPARATIVE EXAMPLE 7

The following materials were pre-blended at room temperature using a super mixer: (a) 70 parts by weight of polybutyleneterephthalate, (b) 30 parts by weight of polyethylene (MI-5), (c) 5 parts by weight of triallyl isocyanurate as a cross-linking promoter, and (d) 0.5 parts by weight of an antioxidant (Irganox1010). The pre-blended materials were fed into a twin screw extruder (diameter: 40 mm; L/D: 42) setting barrel temperature at 260° C., die temperature at 260° C., and screw revolution at 50 rpm. The melt-kneaded material was strand-cut to obtain pellets of the polybutyleneterephthalate based resin composition. The pellets were molded with an injection molding machine (metal mold clamping force: 100 tons; screw diameter: 45 mm) setting barrel temperature at 260° C., injection pressure at 80 kg/cm², pressure-holding time at 15 secs., and metal-mold temperature at 70° C. at obtain test pieces of 1.0 mm thickness having a shape stipulated as Type JIS 3. The test pieces were irradiated with electron beam at accelerating voltage of 3 MeV until they absorbed 100 kGy to obtain test samples. To examine the soldering-heat resistance, a group of test samples was immersed in a tin-lead-alloy solder bath at 260° C. for 10 secs.; another group, for 30 secs.; and yet another group, for 60 secs. The test results showed that the samples tested for 10 secs. and for 30 secs. deformed slightly and the samples tested for 60 secs. melted and deformed significantly. The results show insufficient soldering-heat resistance of the test sample.

Another group of test samples was provided by irradiating test pieces with electron beam until they absorbed 300 kGy. To examine the soldering-heat resistance, a group of test samples was immersed in a tin-lead-alloy solder bath at 260° C. for 10 secs.; another group, for 30 secs.; and yet another group, for 60 secs. The test results showed that the samples tested for 10 secs. showed no deformation or swelling, the samples tested for 30 secs. showed slight deformation, and the samples tested for 60 secs. melted down.

Test samples provided by irradiating electron beam with an absorbed dose of 300 kGy were subjected to a tensile strength test. An original sample showed 380 kg/cm$^2$, an excellent property in mechanical strength. However, the tensile strength of 7 days heat ages sample at 120° C. in a gear oven was 190 kg/cm$^2$, about one-half of the initial value. This result showed poor heat-aging resistance of the test samples irradiated with an absorbed dose of 300 kGy.

EXAMPLE 8

The following materials were pre-blended at room temperature with a super mixer: (a) 70 parts by weight of nylon 6,6 (melting point: 260° C.; specific gravity: 1.15), (b) 30 parts by weight of the same ethylene-methylacrylate-glycidylmethacrylate copolymer as used in Example 7, and (c) 0.5 parts by weight of an antioxidant (Irganox1010). The pre-blended materials were fed into a twin screw extruder (diameter: 40 mm; L/D: 42) setting barrel temperature at 280° C., die temperature at 290° C., and screw rotation at 50 rpm. The melt-kneaded material was strand-cut to obtain pellets of the nylon 6,6-based resin composition. The pellets were molded with an injection molding machine (metal mold-clamping force: 100 tons; screw diameter: 45 mm) setting barrel temperature at 280° C., injection pressure at 100 kg/cm$^2$, pressure-holding time at 15 secs., and metal-mold temperature at 60° C. to obtain test pieces of 1.0 mm thickness having a shape stipulated as Type JIS 3. The test pieces were irradiated with electron beam at accelerating voltage of 3 MeV until they absorbed 100 kGy to obtain test samples.

A group of the test samples was immersed in a tin-lead-alloy solder bath at 260° C. for 10 secs.; another group, for 30 secs.; and yet another group, for 60 secs. The test results demonstrated that every sample showed no deformation or swelling, proving are excellent soldering-heat resistance of the test samples.

Another group of test samples was subjected to a tensile strength test after being dried in a thermostatic oven at 120° C. for 2 hours. The original test sample showed 420 kg/cm$^2$, demonstrating excellent mechanical strength of the test sample. The tensile strength of 7 days heat aging sample at 120° C. was 380 kg/cm$^2$, which was close to the initial value, demonstrating excellent heat-aging resistance of the test sample as well.

COMPARATIVE EXAMPLE 8

The following materials were pre-blended at room temperature using a super mixer: (a) 70 parts by weight of nylon 6,6, (b) 30 parts by weight of the same polyethylene as used in comparative example 7, (c) 5 parts by weight of triallyl cyanurate as a cross-linking promoter, and (d) 0.5 parts by weight of an antioxidant (Irganox1010). The pre-blended materials were fed into a twin screw extruder (diameter: 40 mm; L/D: 42) setting barrel temperature at 280° C., die temperature at 290° C., and screw rotation at 50 rpm. The melt-kneaded material was strand-cut to obtain pellets of the nylon-based resin composition. The pellets were molded with an injection molding machine (metal mold-clamping force: 100 tons; screw diameter: 45 mm) setting barrel temperature at 280° C., injection pressure at 100 kg/cm$^2$, pressure-holding time at 15 secs., and metal-mold temperature at 80° C. to obtain test pieces of 1.0 mm thickness having a shape stipulated as Type JIS 3. The test pieces were irradiated with electron beam at accelerating voltage of 3 MeV until they absorbed 100 kGy to obtain test samples. To examine the soldering-heat resistance, a group of the test samples was dried in a thermostatic oven at 120° C. for 2 hours and then immersed in a tin-lead-alloy solder bath at 260° C. for 10 secs.; another group, for 30 secs.; and yet another group, for 60 secs. The test results showed that the samples tested for 10 secs. showed no deformation or swelling, the samples tested for 30 secs. showed slight deformation, and the samples tested for 60 secs. showed significant deformation. The results show insufficient soldering-heat resistance of the test samples.

The following materials were pre-blended at room temperature using a super mixer: (a) 70 parts by weight of nylon 6,6, (b) 30 weight parts of polyethylene, (c) 5 parts by weight of triallyl cyanurate as a cross-linking promoter, and (d) 0.5 pars by weight of an antioxidant (Irganox1010). The pre-blended materials were fed into a twin screw extruder (diameter: 40 mm; L/D: 42) setting barrel temperature at 280° C. die temperature at 290°, and screw rotation at 50 rpm. The melt-kneaded material was strand-cut to obtain pellets of the nylon-based resin composition. The pellets were molded with an injection molding machine (metal mold-clamping force: 100 tons; screw diameter: 45 mm) setting barrel temperature at 280° injection pressure at 100 kg/cm$^2$, pressure-holding time at 15 secs., and metal-mold temperature at 80° to obtain test pieces of 1.0 mm thickness having a shape stipulated as Type JIS 3. The test pieces were irradiated with electron beam at accelerating voltage of 3 MeV until they absorbed 100 kGy to obtain test samples. To examine the soldering-heat resistance, a group of the test samples was dried in a thermostatic oven at 120° for 2 hours and then immersed in a tin-lead-alloy solder bath at 260° for 0 secs.; another group, for 30 secs.; and yet another group, for 60 secs. The test results showed that the samples tested for 10 secs. showed no deformation or swelling, the samples tested for 30 sees. showed slight deformation, and the samples tested for 60 sees. showed significant deformation. The results show insufficient soldering-beat resistance of the test samples.

EXAMPLE 9

The following materials were pre-blended at room temperature using a super mixer: (a) 70 parts by weight of the melt-kneaded resin mixture of (a1) polyphenylene ether containing a maleic anhydride group with an amount of I weight % and (a2) polystyrene at a ratio of 80:20 by weight, (b) 30 parts by weight of the same ethylenemethylacrylate-glycidylmethacrylate copolymer as used in Example 7, and (c) 1 part by weight of an antioxidant (Irganox1010). The pre-blended materials were fed into a twin screw extruder (diameter: 40 mm; L/D: 42) setting barrel temperature at 280° C., die temperature at 290° C., and screw rotation at 50 rpm. The melt-kneaded material was strand-cut to obtain pellets. The pellets were molded with an injection molding machine (metal mold-clamping force: 100 tons; screw diameter: 45 mm) setting barrel temperature at 280° C., injection pressure at 100 kg/cm$^2$, pressure-holding time at 15 sec, and metal-mold temperature at 80° C. to obtain test pieces of 1.0 mm thickness having a shape stipulated as Type JIS 3. The test pieces were irradiated with electron beam at accelerating voltage of 3 MeV until they absorbed 200 kGy to obtain test samples.

A group of test samples was immersed in a tin-lead-alloy solder bath at 260° C. for 10 secs.; another group, for 30 secs.; and yet another group, for 60 secs. The test results demonstrated that none of the samples showed any deformation or swelling, proving excellent soldering-heat resistance of the test samples.

Another group of test samples was subjected to a tensile strength test. The original sample showed 330 kg/cm$^2$, and the tensile strength of 7 days heat aged sample at 120° C. was 270 kg/cm$^2$. The results demonstrated that both original and heat aged sample showed excellent mechanical.

COMPARATIVE EXAMPLE 9

The following materials were pre-blended at room temperature with a super mixer: (a) 70 parts by weight of the same modified polyphenylene ether as used in Example 9,(b) 30 parts by weight of the same polyethylene as used in comparative example 7, (c) 15 parts by weight of triallyl cyanurate as a cross-linking promoter, and (d) 1 part by weight of an antioxidant (Irganox1010). The pre-blended materials were fed into a twin screw extruder (diameter: 40 mm; L/D: 42) setting barrel temperature at 280° C., die temperature at 290° C., and screw rotation at 50 rpm. The melt-kneaded material was strand-cut to obtain pellets. The pellets were molded with an injection molding machine (metal mold-clamping force: 100 tons; screw diameter: 45 mm) setting barrel temperature at 290° C., injection pressure at 100 kg/cm$^2$, pressure-holding time at 15 sec, and metal-mold temperature at 80° C. to obtain test pieces of 1.0 mm thickness having a shape stipulated as Type JIS 3. The test pieces were irradiated with electron beam at accelerating voltage of 3 MeV until they absorbed 200 kGy to obtain test samples. The test sample melted down by 10 second immersion in a tin-lead-alloy solder bath at 260° C.

EXAMPLE 10-1

The following materials were pre-blended at room temperature using a super mixer: (a) 30 parts by weight of the same pellets of resin composition as obtained in Example 4, which resin composition was obtained by melt-kneading of modified polyphenylene ether, glycidylmethacrylate, etc., and (b) 70 parts by weight of the same pellets of resin composition as obtained in Example 6, which resin composition was obtained by melt-kneading of nylon 6,6, glycidylmethacrylate, etc. The pre-blended materials were fed into a twin screw extruder (diameter: 40 mm; L/D: 42) setting barrel temperature at 280° C., die temperature at 280° C., and screw rotation at 50 rpm. The melt-kneaded material was strand-cut to obtain pellets of the polyphenylene ether-polyamide based polymer alloy. The pellets were molded with an injection molding machine (metal mold clamping force: 100 tons; screw diameter: 45 mm) setting barrel temperature at 280° C., injection pressure at 100 kg/cm$^2$, pressure-holding time at 15 secs., and metal-mold A temperature at 80° C. to obtain test pieces of 1.0 mm thickness having a shape stipulated as Type JIS 3. The test pieces were irradiated with electron beam at accelerating voltage of 3 MeV until they absorbed 150 kGy to obtain test samples.

A group of test samples was immersed in a tin-lead-alloy solder bath at 260° C. for 10 secs.; another group, for 30 secs.; and yet another group, for 60 secs. The test results demonstrated that none of the samples showed any deformation or swelling, proving excellent soldering-heat resistance of the test samples.

Another group of test samples was subjected to a tensile strength test. The original sample showed 390 kg/cm$^2$, demonstrating excellent mechanical strength of the test sample. The tensile strength of 7 days heat aged sample in gear oven at 120° C. was 360 kg/cm$^2$, which was close to the initial value, demonstrating excellent heat-aging resistance of the test sample as well.

EXAMPLE 10-2

The following materials were pre-blended at room temperature using a super mixer: (a) 70 parts by weight of the same pellets of resin composition as obtained in Example 4, which composition was obtained by melt-kneading of modified polyphenylene ether, glycidyl methacrylate, etc., and (b) 30 parts by weight of pellets of the same nylon 6,6 (before melt-kneading) as used in Example 6. The pre-blended materials were fed into a twin screw extruder (diameter: 40 mm; L/D: 42) setting barrel temperature at 280° C., die temperature at 280° C., and screw rotation at 50 rpm. The melt-kneaded material was strand-cut to obtain polyphenylene ether-polyamide based polymer alloy pellets. The pellets were molded with an injection molding machine (metal mold clamping force: 100 tons; screw diameter: 45 mm) setting barrel temperature at 280° C., injection pressure at 100 kg/cm$^2$, pressure-holding time at 10 sec, and metal-mold temperature at 80° C. to obtain test pieces of 1.0 mm thickness having a shape stipulated as Type JIS 3. The test pieces were irradiated with electron beam at accelerating voltage of 3 MeV until they absorbed 150 kGy to obtain test samples.

A group of test samples was immersed in a tin-lead-alloy solder bath at 260° C. for 10 secs.; another group, for 30 secs.; and yet another group, for 60 secs. The test results demonstrated that none of the samples showed any deformation or swelling, proving excellent soldering-heat resistance of the test samples.

Another group of test samples was subjected to a tensile strength test. The original sample showed 300 kg/cm$^2$, demonstrating excellent mechanical strength of the test sample. The tensile strength of 7 days heat aged sample in gear oven at 120° C. was 290 kg/cm$^2$, which was close to the initial value, demonstrating excellent heat-aging resistance of the test sample as well.

EXAMPLE 10-3

The following materials were pre-blended at room temperature using a super mixer: (a) 70 parts by weight of the same pellets of the resin composition as obtained in Example 6, which resin composition was obtained by melt-kneading of nylon 6,6, glycidylmethacrylate, etc., and (b) 30 parts by weight of the same modified polyphenylene ether (before melt-kneading) as used in Example 4. The pre-blended materials were fed into a twin screw extruder (diameter: 40 mm; L/D: 42) setting barrel temperature at 280° C., die temperature at 280° C., and screw revolution at 50 rpm. The melt-kneaded material was strand-cut to obtain pellets of the polyphenylene ether-polyamide-based polymer alloy. The pellets were molded with an injection molding machine (metal mold-clamping force: 180 tons; screw diameter: 45 mm) setting barrel temperature at 280° C., injection pressure at 100 kg/cm$^2$, pressure-holding time at 10 secs., and metal-mold temperature at 80° C. to obtain test pieces of 1.0 mm thickness having a shape stipulated as Type JIS 3. The test pieces were irradiated with electron beam at accelerating voltage of 3 MeV until they absorbed 150 kGy to obtain test samples.

A group of test samples was immersed in a tin-lead-alloy solder bath at 260° C. for 10 secs.; another group, for 30 secs.; and yet another group, for 60 secs. The test results demonstrated that none of the samples showed any deformation or swelling, proving excellent soldering-heat resistance of the test samples.

Another group of test samples was subjected to a tensile strength test. An original test sample showed a strength of 350 kg/cm$^2$, demonstrating excellent mechanical strength of the test sample. The tensile strength of 7 days heat aged, sample in gear oven at 120° C. was 280 kg/cm$^2$, which was dose to the initial value, demonstrating excellent heat-aging resistance of the test sample as well.

EXAMPLE 10-4

The following materials were pre-blended at room temperature using a super mixer: (a) 30 parts by weight of the same pellets of resin composition as obtained in Example 4, which resin composition was obtained by melt-kneading of modified polyphenylene ether, glycidylmethacrylate, etc., and (b) 70 parts by weight of the same pellets of resin composition as obtained in Example 5-1, which resin composition was obtained by melt-kneading of PBT, glycidylmethacrylate, etc. The pre-blended materials were fed into a twin screw extruder (diameter: 40 mm; L/D: 42) setting barrel temperature at 280° C., die temperature at 290° C., and screw revolution at 50 rpm. The melt-kneaded material was strand-cut to obtain pellets of the polyphenylene etherpolybutyleneterephthalate based polymer alloy. The pellets were molded with an injection molding machine (metal mold clamping force: 100 tons; screw diameter: 45 mm) setting barrel temperature at 260° C., injection pressure at 100 kg/cm$^2$, pressure-holding time at 15 secs., and metal-mold temperature at 70° C. to obtain test pieces of 1.0 mm thickness having a shape stipulated as Type JIS 3. The test pieces were irradiated with electron beam at accelerating voltage of 10 MeV until they absorbed 150 kGy to obtain test samples.

A group of test samples was immersed in a tin-lead-alloy solder bath at 260° C. for 10 secs.; another group, for 30 secs.; and yet another group, for 60 secs. The test results demonstrated that none of the samples showed any deformation or swelling, proving excellent in soldering-heat resistance of the test samples.

Another group of test samples was subjected to a tensile strength test. An original test sample showed a strength of 350 kg/cm$^2$, demonstrating excellent mechanical strength of the test sample. The tensile strength of 7 days heat aged sample in gear oven at 120° C. was 280 kg/cm$^2$, which was close to the initial value, demonstrating excellent heat-aging resistance of the test sample as well.

COMPARATIVE EXAMPLE 10-1

The following materials were pre-blended at room temperature using a super mixer: (a) 70 parts by weight of the same resin mixture used in Comparative Example 4-2, which material was obtained by melt-kneading polyphenylene ether and polystyrene at a ratio of 80:20 by weight, (b) 30 parts by weight of the same nylon 6,6 as used in Example 6, (c) 10 parts by weight of triallyl isocyanurate, and (d) 0.5 parts by weight of an antioxidant (Irganox1010). The pre-blended materials were fed into a twin screw extruder (diameter: 40 mm; L/D: 42) setting barrel temperature at 290° C., die temperature at 290° C., and screw rotation at 50 rpm. The melt-kneaded material was strand-cut to obtain pellets. The pellets were molded with an injection molding machine (metal mold-clamping force: 100 tons; screw diameter: 45 mm) setting barrel temperature at 280° C., injection pressure at 100 kg/cm$^2$, pressure-holding time at 15 secs., and metal-mold temperature at 80° C. to obtain test pieces of 1.0 mm thickness having a shape stipulated as Type JIS 3. The test pieces were irradiated with electron beam at accelerating voltage of 3 MeV until they absorbed 150 kGy to obtain test samples. When a test sample was immersed in a tin-lead-alloy solder bath of at 260° C. for 10 secs., the test sample melted down. In addition, another test sample provided by irradiating electron beam with absorbed dose of 300 kGy was immersed in a tin-lead-alloy solder bath at 260° C. for 10 secs. The result was the same: the test sample melted down.

COMPARATIVE EXAMPLE 10-2

The following materials were pre-blended at room temperature using a super mixer: (a) 30 parts by weight of the same PBT as used in Example 5-1, (b) 70 parts by weight of the same polymer mixture as used in Comparative Example 4-2, which material was obtained by melt-kneading of polyphenylene ether and polystyrene at a ratio of 80:20 by weight, (c) 10 parts by weight of triallyl isocyanurate, and (d) 0.5 parts by weight of an antioxidant (Irganox1010). The pre-blended materials were fed into a twin screw extruder (diameter: 40 mm; L/D: 42) setting barrel temperature at 290° C., die temperature at 290° C., and screw rotation at 50 rpm. The melt-kneaded material was strand-cut to obtain pellets. The pellets were molded with an injection molding machine (metal mold clamping force: 180 tons; screw diameter: 45 mm) setting barrel temperature at 280° C., injection pressure at 100 kg/cm$^2$, pressure-holding time at 15 secs., and metal-mold temperature at 80° C. to obtain test pieces of 1.0 mm thickness having a shape stipulated as Type JIS 3. The test pieces were irradiated with electron beam at accelerating voltage of 3 MeV until they absorbed 150 kGy to obtain test samples. When a test sample was immersed in a tin-lead-alloy solder bath at 260° C. for 10 secs., the test sample melted. In addition, another test sample provided by irradiating electron beam with absorbed dose of 300 kGy was immersed in a tin-lead-alloy solder bath at 260° C. for 10 secs. The result was the same: the test sample melted down.

EXAMPLE 11-1

The following materials were pre-blended at room temperature using a super mixer: (a) 30 parts by weight of the same pellets of resin composition as obtained in Example 9, which resin composition was obtained by melt-kneading of modified polyphenylene ether, ethylene-methylacrylate-glycidylmethacrylate copolymer, etc., and (b) 70 parts by weight of the same pellets of resin composition as obtained in Example 7, which resin composition was obtained by melt-kneading of PBT, ethylene-methylacrylate-glycidylmethacrylate copolymer, etc. The pre-blended materials were fed into a twin screw extruder (diameter: 40 mm; L/D: 42) setting barrel temperature at 280° C., die temperature at 290° C., and screw rotation at 50 rpm. The melt-kneaded material was strand-cut to obtain pellets of the polyphenylene ether-polybutyleneterephthalate based polymer alloy. The pellets were molded with an injection molding machine (metal mold clamping force: 100 tons; screw diameter: 45 mm) setting barrel temperature at 260° C., injection pressure at 100 kg/cm², pressure-holding time at 15 sec, and metal-mold temperature at 70° C. to obtain test pieces of 1.0 mm thickness having a shape stipulated as Type JIS 3. The test pieces were irradiated with electron beam at accelerating voltage of 10 MeV until they absorbed 150 kGy to obtain test samples.

A group of test samples was immersed in a tin-lead-alloy solder bath at 260° C. for 10 secs.; another group, for 30 secs.; and yet another group, for 60 secs. The test results demonstrated that none of the samples showed any deformation or swelling, proving excellent soldering-heat resistance of the test samples. Another group of test samples was subjected to a tensile strength test. The original test sample showed 350 kg/cm², demonstrating excellent mechanical strength of the test sample. The tensile strength of 7 days heat aged sample in gear oven at 120° C. was 280 kg/cm², demonstrating excellent heat-aging resistance of the test sample as well.

EXAMPLE 11-2

The following materials were pre-blended at room temperature using a super mixer: (a) 30 parts by weight of the same pellets of resin composition as obtained in Example 9, which resin composition was obtained by melt-kneading of modified polyphenylene ether, ethylene-methylacrylate-glycidylmethacrylate copolymer, etc., and (b) 70 parts by weight of the same pellets of resin composition as obtained in Example 8, which resin composition was obtained by melt-kneading of nylon 6,6, ethylene-methylacrylate-glycidylmethacrylate copolymer, etc. The pre-blended materials were fed into a twin screw extruder (diameter: 40 mm; L/D: 42) setting barrel temperature at 280° C., die temperature at 280° C., and screw rotation at 50 rpm. The melt kneaded material was strand-cut to obtain pellets of the polyphenylene ether-polyamide based polymer alloy. The pellets were molded with an injection molding machine (metal mold clamping force: 100 tons; screw diameter: 45 mm) setting barrel temperature at 280° C., injection pressure at 100 kg/cm², pressure-holding time at 15 secs., and metal-mold temperature at 80° C. to obtain test pieces of 1.0 mm thickness having a shape stipulated as Type JIS 3. The test pieces were irradiated with electron beam at accelerating voltage of 3 MeV until they absorbed 150 kGy to obtain test samples.

A group of test samples was immersed in a tin-lead-alloy solder bath at 260° C. for 10 secs.; another group, for 30 secs.; and yet another group, for 60 secs. The test results demonstrated that none of the samples showed any deformation or swelling, proving excellent in soldering-heat resistance of the test samples.

Another group of test samples was subjected to a tensile strength test. The original test sample showed 390 kg/cm², demonstrating excellent mechanical strength of the test sample. The tensile strength of 7 days heat aged sample in gear oven at 120° C. was 360 kg/cm², which was close to the initial value, demonstrating excellent heat-aging resistance of the test sample as well.

INDUSTRIAL APPLICABILITY

Table 1 summarizes Examples and Comparative Examples. As can be seen from Table 1, Comparative Examples are either insufficient in a soldering-heat resistance of a 260° C. specification or poor in heat-aging resistance even if sufficient in a soldering-heat resistance of a 260° C. specification. Comparative Examples that are unsatisfactory in the soldering-heat resistance test at 260° C. for 10 secs. can be judged to be unsatisfactory in the soldering-heat resistance tests at 260° C. for 30 secs. and at 260° C. for 60 secs.

On the other hand, Examples of the present invention are sufficient in a soldering-heat resistance of a 260° C. specification, demonstrating high soldering heat resistance and excellent heat-aging resistance. The present invention materializes these superior properties by using common engineering plastics, which are less-costly in spite of their excellent processability in injection molding. The present invention can offer a molded product that is superior in the above-mentioned properties and that can be used effectively and extensively in the field of surface-mounting technology of electronic parts such as PCB connectors.

TABLE 1

|  | Absorbed dose (kGy) | 260° C. soldering-heat resistance | | | Tensile strength | | Judgement for heat-aging resistance |
|---|---|---|---|---|---|---|---|
|  |  | For 10 secs. | For 30 secs. | For 60 secs. | Initial state kg/cm² | After aging kg/cm² |  |
| Example 1 | 150 | ○ | ○ | ○ | 360 | 290 | ○ |
| Example 2 | 200 | ○ | ○ | ○ | 280 | 280 | ○ |
| Example 3-1 | 200 | ○ | ○ | ○ | 280 | 280 | ○ |
| Example 3-2 | 200 | ○ | ○ | ○ | 280 | 280 | ○ |
| Example 4 | 200 | ○ | ○ | ○ | 330 | 270 | ○ |
| Example 5-1 | 100 | ○ | ○ | ○ | 410 | 380 | ○ |
| Example 5-2 | 200 | ○ | ○ | ○ | 440 | 340 | ○ |
| Example 5-3 | 200 | ○ | ○ | ○ | 420 | 390 | ○ |
| Example 5-4 | 200 | ○ | ○ | ○ | 380 | 390 | ○ |
| Example 6 | 100 | ○ | ○ | ○ | 420 | 380 | ○ |
| Example 7 | 100 | ○ | ○ | ○ | 410 | 380 | ○ |
| Example 8 | 100 | ○ | ○ | ○ | 420 | 380 | ○ |
| Example 9 | 200 | ○ | ○ | ○ | 330 | 270 | ○ |
| Example 10-1 | 150 | ○ | ○ | ○ | 390 | 360 | ○ |
| Example 10-2 | 150 | ○ | ○ | ○ | 300 | 290 | ○ |
| Example 10-3 | 150 | ○ | ○ | ○ | 350 | 280 | ○ |
| Example 11-1 | 150 | ○ | ○ | ○ | 350 | 280 | ○ |
| Example 11-2 | 150 | ○ | ○ | ○ | 390 | 360 | ○ |

TABLE 1-continued

| | Absorbed dose (kGy) | 260° C. soldering-heat resistance | | | Tensile strength | | Judgement for heat-aging resistance |
|---|---|---|---|---|---|---|---|
| | | For 10 secs. | For 30 secs. | For 60 secs. | Initial state kg/cm$^2$ | After aging kg/cm$^2$ | |
| Comparative Example 1-1 | 150 | x | | | | | |
| Comparative Example 1-2 | 150 | x | | | | | |
| Comparative Example 2 | 200 | x | | | | | |
| Comparative Example 3-1 | 200 | | | x | | | |
| Comparative Example 3-2 | 200 | | | x | | | |
| Comparative Example 4-1 | 200 | x | | | | | |
| Comparative Example 4-2 | 200 | x | | | | | |
| Comparative Example 5 | 100 | Δ | Δ | x | 350 | 170 | x |
| | 300 | ○ | Δ | x | | | |
| Comparative Example 6 | 100 | Δ | Δ | x | 380 | 80 | x |
| | 300 | ○ | ○ | ○ | | | |
| Comparative Example 7 | 100 | Δ | Δ | x | 330 | 190 | x |
| | 300 | ○ | Δ | x | | | |
| Comparative Example 8 | 100 | ○ | Δ | x | 340 | 90 | x |
| | 300 | ○ | ○ | ○ | | | |
| Comparative Example 9 | 200 | x | | | | | |
| Comparative Example 10-1 | 150 | x | | | | | |
| | 300 | x | | | | | |
| Comparative Example 10-2 | 150 | x | | | | | |
| | 300 | x | | | | | |

What is claimed is:

1. A heat-resistant molded product capable of withstanding a soldering operation at 260° C. for 60 seconds, the heat-resistant molded product being produced by the following steps:
   (a) melt-kneading:
      (a1) an engineering plastic (P) either having or introduced an active site for reacting with a specific functional group; and
      (a2) polyolefin (Q) having the said specific functional group; to obtain a resin composition (R)
   (b) melt-molding resin composition (R); and
   (c) irradiating the melt-molded resin composition with ionizing radiation.

2. A heat-resistant molded product capable of withstanding a soldering operation at 260° C. for 60 seconds, the heat-resistant molded product being produced by the following steps:
   (a) melt-kneading:
      (a1) an engineering plastic (P) either having or introduced an active site for reacting with a specific functional group; and
      (a2) an organic compound (S) that has both the said specific functional group and a polymerizing functional group in the same molecule; to obtain a resin composition (T)
   (b) melt-molding a resin composition (T); and
   (c) irradiating the melt-molded resin composition with ionizing radiation.

3. A heat-resistant molded product capable of withstanding a soldering operation at 260° C. for 60 seconds, the heat-resistant molded product being produced by the following steps:
   (a) melt-kneading:
      (a1) a maleic anhydride group introduced styrene based polymer; and
      (a2) an organic compound that has in the same molecule:
         (a2a) a polymerizing functional group selected from the groups consisting of vinyl group, allyl group, acrylic group, and methacrylic group; and
         (a2b) a functional group selected from the groups consisting of amino group and epoxy group;
   (b) melt-molding a resin composition produced by step (a); and
   (c) irradiating the melt-molded resin composition with ionizing radiation.

4. A heat-resistant molded product capable of withstanding a soldering operation at 260° C. for 60 seconds, the heat-resistant molded product being produced by the following steps:
   (a) melt-kneading:
      (a1) an oxazoline group introduced styrene based polymer; and
      (a2) an organic compound that has in the same molecule:
         (a2a) a polymerizing functional group selected from the groups consisting of vinyl group, allyl group, acrylic group, and methacrylic group; and
         (a2b) a functional group selected from the groups consisting of amino group, carboxylic acid group, hydroxyl group, epoxy group, and thiol group;
   (b) melt-molding a resin composition produced by step (a); and
   (c) irradiating the melt-molded resin composition with ionizing radiation.

5. A heat-resistant molded product capable of withstanding a soldering operation at 260° C. for 60 seconds, the heat-resistant molded product being produced by the following steps:
(a) melt-kneading:
(a1) a carboxyl acid group introduced styrene based polymer; and
(a2) an organic compound that has in the same molecule:
(a2a) a polymerizing functional group selected from the groups consisting of vinyl group, allyl group, acrylic group, and methacrylic group; and
(a2b) a functional group selected from the groups consisting of amino group, epoxy group, hydroxyl group, and thiol group;
(b) melt-molding a resin composition produced by step (a); and;
(c) irradiating the melt-molded resin composition with ionizing radiation.

6. A heat-resistant molded product capable of withstanding a soldering operation at 260° C. for 60 seconds, the heat-resistant molded product being produced by the following steps:
(a) melt-kneading:
(a1) polyphenylene ether having a maleic anhydride group; and
(a2) an organic compound that has in the same molecule:
(a2a) a polymerizing functional group selected from the groups consisting of vinyl group, allyl group, acrylic group, and methacrylic group; and
(a2b) a functional group selected from the groups consisting of amino group and epoxy group;
(b) melt-molding a resin composition produced by step (a); and;
(c) irradiating the melt-molded resin composition with ionizing radiation.

7. A heat-resistant molded product capable of withstanding a soldering operation at 260° C. for 60 seconds, the heat-resistant molded product being produced by the following steps:
(a) melt-kneading:
(a1) polybutyleneterephthalate; and
(a2) an organic compound that has in the same molecule:
(a2a) a polymerizing functional group selected from the groups consisting of vinyl group, allyl group, acrylic group, and methacrylic group; and
(a2b) a functional group selected from the groups consisting of amino group, hydroxyl group, epoxy group, and carboxylic acid group;
(b) melt-molding a resin composition produced by step (a); and;
(c) irradiating the melt-molded resin composition with ionizing radiation.

8. A heat-resistant molded product capable of withstanding a soldering operation at 260° C. for 60 seconds, the heat-resistant molded product being produced by the following steps:
(a) melt-kneading:
(a1) polyamide resin; and
(a2) au organic compound that has in the same molecule:
(a2a) a polymerizing functional group selected from the groups consisting of vinyl group, allyl group, acrylic group, and methacrylic group; and
(a2b) an atomic group having a functional group selected from the groups consisting of epoxy group and carboxylic acid group;
(b) melt-molding a resize composition produced by step (a); and;
(c) irradiating he melt-molded resin composition with ionizing radiation.

9. A heat-resistant molded product capable of withstanding a soldering operation at 260° C. for 60 seconds, the heat-resistant molded product being produced by the following steps:
(a) melt-kneading:
(a1) polyphenylene ether having a maleic anhydride group; and
(a2) an organic compound that has in the same molecule:
(a2a) a polymerizing functional group selected from the groups consisting of vinyl group, allyl group, acrylic group, and methacrylic group; and
(a2b) a functional group selected from the groups consisting of amino group and epoxy group; to obtain a resin composition (A);
(b) melt-kneading:
(b1) polybutyleneterephthalate; and
(b2) an organic compound that has in the same molecule:
(b2a) a polymerizing fictional group selected from the groups consisting of vinyl group, allyl group, acrylic group, and methacrylic group; and
(b2b) a functional group selected from the groups consisting of amino group, hydroxyl group, epoxy group, and carboxylic acid group; to obtain resin composition (B); and
(c) melt-kneading a resin composition (A) and a resin composition (B) to produce a polymer alloy resin composition; and
(d) melt-molding a polymer alloy of the resin composition (A) and the resin composition (B); and
(e) irradiating the melt-molded resin composition with ionizing radiation.

10. A heat-resistant molded product capable of withstanding a soldering operation at 260° C. for 60 seconds, the heat-resistant molded product being produced by the following steps:
(a) melt-kneading:
(a1) polyamide resin; and
(a2) an organic compound that has in the same molecule:
(a2a) a polymerizing functional group selected from the groups consisting of vinyl group, allyl group, acrylic group, methacrylic group; and
(a2b) an atomic group having a functional group selected from the groups consisting of epoxy group and carboxylic acid group; to obtain a resin composition (C);
(b) melt-kneading a resin composition (C) and a resin composition (A) as defined in claim 9 to produce a polymer alloy resin composition; and
(c) melt-molding a polymer alloy of the resin composition (C) and the resin composition (A); and
(d) irradiating the melt-molded resin composition with ionizing radiation.

11. The heat-resistant molded product as defined in claim 1, wherein the engineering plastic (P) is polybutyleneterephthalate.

12. The heat-resistant molded product as defined in claim 1, wherein the engineering plastic (P) is polyamide resin.

13. At The heat-resistant molded product as defined in claim 1, wherein the polyolefin (Q) is polyolefin having graft-polymerized or copolymerized maleic anhydride, glycidylmethacrylate, acrylic acid, or methacrylic acid.

14. A heat-resistant molded product capable of withstanding a soldering operation at 260° C. for 60 seconds, the heat-resistant molded product being produced by the following steps:
  (a) melt-kneading:
    (a1) polyphenylene ether having maleic anhydride group; and
    (a2) polyolefin having graft-polymerized or copolymerized maleic anhydride, glycidylmethacrylate, acrylic acid, or methacrylic acid; to obtain a resin composition (D); and
  (b) melt-kneading:
    (b1) polybutyleneterephthalate; and
    (b2) polyolefin having graft-polymerized or copolymerized maleic anhydride, glycidylmethacrylate, acrylic acid, or methacrylic acid; to obtain a resin composition (E); and
  (c) melt-kneading a resin composition (D) and a resin composition (E); and
  (d) melt-molding a polymer alloy of the resin composition (D) and the resin composition (E); and
  (e) irradiating the melt-molded resin composition with ionizing radiation.

15. A heat-resistant molded product capable of withstanding a soldering operation at 260° C. for 60 seconds, the heat-resistant molded product being produced by the following steps:
  (a) melt-kneading:
    (a1) polyamide resin; and
    (a2) polyolefin having graft-polymerized or copolymerized maleic anhydride, glycidylmethacrylate, acrylic acid, or methacrylic acid; to obtain a resin composition (F); and
  (b) melt-kneading a resin composition (F) and a resin composition (D) as defined in claim 14 to produce a polymer alloy comprising a resin composition (F) and a resin composition (D); and,
  (c) melt-molding a polymer alloy comprising a resin composition (F) and a resin composition (D); and,
  (d) irradiating the melt-molded resin composition with ionizing radiation.

* * * * *

UNITED STATES PATENT AND TRADEMARK OFFICE
CERTIFICATE OF CORRECTION

PATENT NO. : 6,673,867 B1
DATED : January 6, 2004
INVENTOR(S) : Hiroshi Hayami et al.

It is certified that error appears in the above-identified patent and that said Letters Patent is hereby corrected as shown below:

Column 29,
Line 63, change "au organic" to -- an organic --

Column 30,
Line 4, change "a resize" to -- a resin --
Line 6, change "irradiating he" to -- irradiating the --
Line 38, "polymerizing fictional" to -- polymerizing functional --

Column 31,
Line 3, "At The" to -- The --

Signed and Sealed this

Sixth Day of July, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,673,867 B1  
DATED : January 6, 2004  
INVENTOR(S) : Hiroshi Hayami et al.

It is certified that error appears in the above-identified patent and that said Letters Patent is hereby corrected as shown below:

Column 29,  
Line 63, change "au organic" to -- an organic --

Column 30,  
Line 4, change "a resize" to -- a resin --  
Line 6, change "irradiating he" to -- irradiating the --  
Line 28, "polymerizing fictional" to -- polymerizing functional --

Column 31,  
Line 3, "At The" to -- The --

This certificate supersedes Certificate of Correction issued July 6, 2004

Signed and Sealed this

Ninth Day of November, 2004

JON W. DUDAS  
*Director of the United States Patent and Trademark Office*